(12) United States Patent  (10) Patent No.: US 8,234,333 B2
Morard  (45) Date of Patent: Jul. 31, 2012

(54) THIN CLIENT DEVICE AND METHOD OF USE

(75) Inventor: Jean-Pierre Morard, Neuilly sur Seine (FR)

(73) Assignee: Sagem Communications SAS, Paris (FR)

( * ) Notice: Subject to any disclaimer, the term of this patent is extended or adjusted under 35 U.S.C. 154(b) by 0 days.

(21) Appl. No.: 12/525,400

(22) PCT Filed: Feb. 1, 2008

(86) PCT No.: PCT/FR2008/050165
§ 371 (c)(1),
(2), (4) Date: Nov. 4, 2009

(87) PCT Pub. No.: WO2008/099127
PCT Pub. Date: Aug. 21, 2008

(65) Prior Publication Data
US 2010/0057841 A1    Mar. 4, 2010

(30) Foreign Application Priority Data
Feb. 1, 2007 (FR) .................................. 07 52994

(51) Int. Cl.
*G06F 15/16* (2006.01)
(52) U.S. Cl. ........................................................ 709/203
(58) Field of Classification Search .................. 709/203, 709/219
See application file for complete search history.

(56) References Cited

U.S. PATENT DOCUMENTS

| | | | | |
|---|---|---|---|---|
| 6,581,098 B1 * | 6/2003 | Kumpf | ................ | 709/227 |
| 7,562,128 B1 * | 7/2009 | Caris et al. | ................ | 709/220 |
| 7,688,461 B2 * | 3/2010 | Wise | ................ | 358/1.15 |
| 2005/0228887 A1 * | 10/2005 | Wang et al. | ................ | 709/227 |
| 2006/0002427 A1 * | 1/2006 | MacInnis et al. | ................ | 370/477 |
| 2006/0020848 A1 * | 1/2006 | Maity et al. | ................ | 714/6 |
| 2006/0129634 A1 * | 6/2006 | Khouzam et al. | ................ | 709/203 |
| 2006/0236347 A1 * | 10/2006 | Holovacs | ................ | 725/80 |
| 2007/0203979 A1 * | 8/2007 | Walker et al. | ................ | 709/204 |
| 2007/0211734 A1 * | 9/2007 | Yang et al. | ................ | 370/401 |
| 2007/0276763 A1 * | 11/2007 | Kleinman et al. | ................ | 705/64 |
| 2010/0332580 A1 * | 12/2010 | Hoerl et al. | ................ | 709/201 |

FOREIGN PATENT DOCUMENTS
EP 1 471 418 A2 10/2004
WO WO-2006/074110 A2 7/2006
* cited by examiner

*Primary Examiner* — Douglas Blair
*Assistant Examiner* — Jason Recek
(74) *Attorney, Agent, or Firm* — IM IP Law PLLC; C. Andrew Im

(57) ABSTRACT

The invention increases the functionalities of a television receiver/decoder STB device by transferring a local port of the thin client device STB via a network to which the thin client device is connected. Said port is then viewed as a local port by a server device, accessible via the network to which the thin client device is connected. It is then possible to install a pilot on said server, for controlling the peripheral equipment connected to the transferred local port. The user of the thin client device can then drive, via a transferred user interface, the peripheral equipment which is physically connected to the thin client but logically connected to the server.

6 Claims, 2 Drawing Sheets

THIN CLIENT DEVICE AND METHOD OF USE

RELATED APPLICATIONS

This application is a §371 application from PCT/FR2008/050165 filed Feb. 1, 2008 which claims priority from French Patent Application No. 07 52994 filed Feb. 1, 2007, each of which is herein incorporated by reference in its entirety.

TECHNICAL FIELD OF THE INVENTION

The invention concerns a thin client device and a thin client device user method.

The field of the invention is that of thin clients. A thin client is a device, and/or an application, that performs little or no processing. In practice, processing is limited to the consideration of a man-machine interface and thus to the decompression of instruction sequences formatting a display. Such consideration includes the aptitude to decompress audio and/or video sequences. More especially, the field of invention is that of high-tech television receivers-decoders, also known as Set Top Boxes (STB).

One aim of the invention is to increase the functionalities of STB-type devices.

Another aim of the invention is to perpetuate the increase in the functionalities.

BACKGROUND OF THE INVENTION

In the prior art, STBs are already known, but such devices are not equipped with a peripheral. It is planned, in the evolution of such apparatus, to equip them with remote-controlled interface capacity, i.e. the ability to act like a thin client with respect to an interface server. Such ability is at least the capacity to receive and interpret display instructions, and to emit command messages produced after detecting a type of prompting from an input device connected to the STB. Such behaviour and performance is known as the terminal server.

Nevertheless, this operating mode is in fact ill-adapted to the management of peripherals connected to the STB. Indeed, a peripheral requires a driver in order to enable the apparatus to which it is connected to command the peripheral correctly. Moreover, such drivers often implicate processing performed by the apparatus on which the drivers are installed. Such drivers are, more often than not, incompatible with the power of the apparatus to which the peripheral is connected.

Another problem is that each peripheral requires its own driver, which should be installed on the apparatus driving the peripheral. Insofar as the STB-type device is made reliable due to the relative impossibility to update its application code, this implies that the STB manufacturer is obliged to foresee and safeguard drivers for every peripheral that a user is liable to connect to the STB. This is virtually impossible.

STBs, according to the current art and to that planned to come, are thus not compatible with the comprehensive and efficient driver ability of a peripheral connected to a local port on an STB.

OBJECT AND SUMMARY OF THE INVENTION

In the invention, such problems are resolved by transporting a local port of thin client device via a network to which the thin client device is connected. This port is then considered as a local port by a server device, accessible via the network to which the thin client device is connected, and where it becomes possible to install a driver for the purpose of commanding the peripheral connected to the transported local port. The user of a thin client device is thus able, via a transported user interface, to drive the peripheral connected physically to the thin client, but logically to the server.

The purpose of the invention is thus a thin client device comprising a primary interface for connecting to a network, characterised in that:
  the thin client comprises a virtual client application capable of being connected, via the primary interface, to a server application for virtualising applications triggered off by a server device that comprises a second network connection interface, with connection between the client and the server applications then being performed via the primary interface, the network and the second interface, using a remote interface protocol common to both virtualising applications,
  the thin client comprises at least one primary local connection port of a peripheral,
  the thin client comprises a primary gateway in order to interface the primary connection port with the primary interface, the server comprising a second gateway in order to interface a peripheral driver connected to the primary port with the second interface and to enable the server application to use the primary port like a local port of the server.

In a variant, the device according to the invention is also characterised in that it comprises a command peripheral, producing command messages received by the thin client device and transmitted by it via the network to the server device.

In a variant, the device according to the invention is also characterised in that the thin client is a television decoder box.

In a variant, the device according to the invention is also characterised in that the primary port is of a type contained in the list comprising at least:
  Universal Serial Bus (USB),
  IEEE 1394,
  DB9,
  Wi-Fi®,
  Bluetooth.

The invention also concerns a device-user method according to one of the previous variants, characterised in that it comprises the following steps:
  connection of the client application to the server application,
  emission via the data server application containing the description of a man-machine interface,
  client application display of the man-machine interface via interpretation of said data,
  production, via a user and via validation of an element of the man-machine interface, of a start-up command for a peripheral connected to the connection port of a peripheral,
  detection, via the thin client, of the command produced by the user,
  production, via the thin client, of a command message describing the command produced,
  emission of the command message towards the server device,
  interpretation of the command message and start-up of the peripheral connected to the connection port in accordance with the command message interpretation.

BRIEF DESCRIPTION OF THE DRAWINGS

The invention will be better understood after reading the following description and studying the figures included The figures show.

DETAILED DESCRIPTION OF THE EMBODIMENTS

Figure 1:
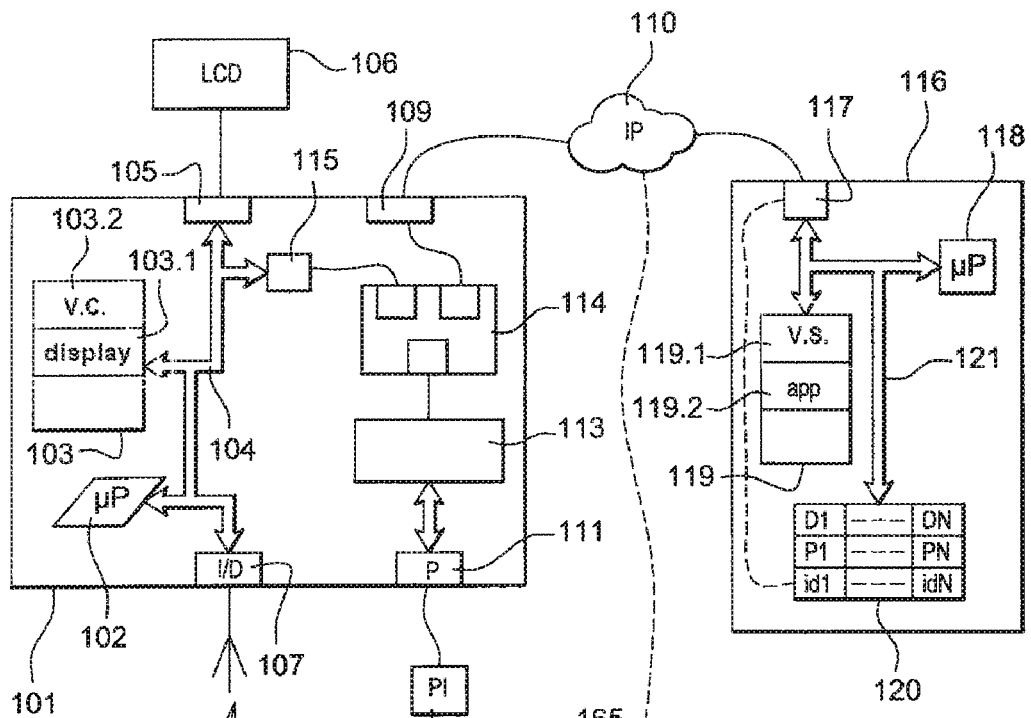
FIG. 1: illustration of the start-up of a device of the invention in accordance with a first embodiment.

FIG. 1 illustrates a thin client device 101. In the example illustrating the invention, the device 101 is a television receiver-decoder, also known as STB (Set Top Box). Henceforth, the term STB 101 shall be used, being understood that such denomination is not solely limited to the invention.

FIG. 1 illustrates that the STB 101 comprises a microprocessor 102 and a programme memory 103, the parts 102 and 103 being connected via a bus 104.

When an action is indicated to a device, such action is in fact performed by a microprocessor of said device, the said microprocessor being controlled by instruction codes recorded in a programme memory of said device. The same applies when an action is indicated to an application. An application is in fact a series of instruction codes recorded with in a memory of a device. The action indicated to the application is thus performed by a microprocessor of the device inside a memory serving to record the application's instruction codes.

The STB 101 comprises circuits 105 enabling to connect the STB 101 to a screen 106. The screen 106 enables at least to view programmes and/or video sequences decoded by the STB 101. The circuits 105 are also connected to the bus 104.

The STB 101 comprises interface circuits 107 between the bus 104 and a command peripheral 108 of the STB 101. The peripheral 108 is, for example, a remote control device. The circuits 107 are, for example, infra-red circuits. In another start-up version, the circuits 107 are radio circuits of the Wifi or BlueTooth type, or of another standard. In yet another start-up version, the circuits 107 are circuits according to a standard corresponding to a wired connection, such as USB, DB9, DIN or PS/2, to quote just the most common standards. The peripheral 107 may also be different, for example, a verification device and/or a (PC) personal computer-type keyboard. At this point, it is to be noted that a remote control device generally comprises a verification facility.

The aforementioned parts described with regard to the STB 101 are standard parts of an STB.

The memory 103 comprises at least two zones.

A zone 103.1 comprises instruction codes for driving the circuits 105 in accordance with the display instructions. The zone 103.1 is thus a video driver enabling the STB 101 to display images on the screen 106 via the connector 105.

A zone 103.2 comprises instruction codes corresponding to a virtual client application. Such an application fulfils at least three tasks.

Connection to a virtualising server application via the triggering off of a specific protocol, with such protocol being referred to under the remote interface protocol (i.e. "RUI" standing for "Remote User Interface"), the connection thus becoming an RUI connection.

emission of command messages, via an RUI connection, describing the actions performed by the user of the thin client device via an input peripheral of the thin client device. For the case in hand, this refers to actions performed by the user of the STB 101 on the remote control 108.

reception of a video sequence via the RUI connection and display of said video sequence on a screen, namely the screen 106.

The most well known RUI protocols are:
RDP (Remote Desktop Protocol),
ICA (independent Computing Architecture)
XRT (Extended Remote Technology),
VDI (Virtual Device Interface).

The invention is nevertheless not limited to the use of any one of these protocols.

FIG. 1 illustrates that the STB 101, according to the invention, also comprises an interface 109, enabling to connect the STB 101 to a network 110. In our example, the network 110 is an IP network. Again in our example, the interface 109 is an RJ45 connector according to the Ethernet standard.

In another start-up version, the STB 101 is connected to the network 110 via a wireless connection solution, such as a Wifi connection. In yet another start-up version, the network 110 is achieved via powerline-carrier technologies.

The STB 101 also comprises a local port 111 enabling to connect a local peripheral 112 to the STB 101. It is considered for the example that the port 111 is a USB port. The port 111 could be of a different type among at least those quoted for the circuits 107.

The peripheral 112 is, for example, a printing device. Nevertheless, it is to be noted that the peripheral 101 may be any peripheral compatible with the port 111. For the example, in the case of a USB port, a CD/DVD player/writer or a mass storage peripheral may be quoted. It is recalled that a digital camera is regarded as a mass storage peripheral via a USB connection.

FIG. 1 shows that the port 111 is connected to a transport gateway 113 of the port 111. In a primary start-up version of the invention, the gateway 113 transforms the port 111 into an Ethernet port. This enables the port 111, and particularly the peripheral connected thereto, to be considered as a network peripheral on the network 110. In order to attain this result, the STB 101 also comprises a hub 114 (also referred to as a 'switch') on the gateway 113, on the connector 109 and on the interface Ethernet circuits 115 between the bus 104 and the hub 114. The hub 114 enables to spit up the port 109 and thus to associate two network addresses with the STB 110. One of these addresses corresponds to the port 111, the other corresponds to the other elements of the STB. The addresses corresponding to the port 111 are referred to here as "addPer", with the address corresponding to the other elements called "addSTB".

In another start-up version of the invention, here referred to as the second start-up, the device 114 is a mini-router. That is to say, a device that enables to associate a logical port of the STB 101 network address with the gateway 113. It is here recalled that the network communications are conducted via the "connection interfaces" (or "sockets"). A connection interface comprises a network address and a port number. In this second start-up, a port number NP113 is allocated, by the device 114, to the gateway 113. The device 114 then initiates "port transfer" (or "port forwarding"), thus ensuring that the network frames received via the interface 109 on the port NP113 are transferred to the gateway 113.

FIG. 1 illustrates a server 116 connected to the network 110 via an interface 117. The server 116 corresponds to the primary start-up version of the invention. The server 116 also comprises a microprocessor 118, a programme memory 119 and a peripheral configuration memory 120. The elements 117 to 120 are interlinked via a bus 121.

The memory 119 comprises at least one zone 119.1 containing instruction codes corresponding to a virtualising server. A virtualising server fulfils at least three tasks.

Connection to a virtual client application via the triggering off of a RUI protocol.

Reception of command messages and the interpretations of such commands, via the RUI connection, thereby provoking the start-up of a local application on the server.

Production and emission, via the RUI connection, of a video sequence corresponding to the start-up of the local application on the server.

The memory 119 comprises at least one zone 119.2 containing the instruction codes corresponding to a local application.

It is here noted that the local application 119.2 is virtualised by the server 116, and becomes a remote application for the virtual client application 103.2. In other words, due to the RUI protocol, a user of the STB 101 is capable of running the application 119.2 on the server 116. The virtual client application transmits the actions by the user on the remote control 108 to the virtualising server application and receives in return a video sequence corresponding to the interpretation of these actions by the server 116.

The memory 120 describes the peripherals connected to the server 116. The memory 120 enables to associate a peripheral identifier with a driver and with a port. Each column of the memory 120 corresponds to a peripheral that may be used by the server 116. The ports are of several types among at least:

local port,
network port,

In an example, it is considered that the peripheral 112 is a DVD player/writer. In such a case, the memory 120 comprises a column associating the driver of the DVD player/writer model with a network port whose address is addPer.

In another example, it is considered that the peripheral 112 is a USB key. In such a case, the memory 120 comprises a column associating the mass storage peripheral driver with a network port whose address is addPer.

In another example, it is considered that the peripheral 112 is a printing device. In such a case, the memory 120 comprises a column associating the printer driver 112 with a network port whose address is addPer.

The identifiers are, for example, the name of the peripheral.

The addSTB and addPer addresses are saved in a configuration memory of the STB 101. These addresses are either fixed by manual configuration using a configuration menu of the STB 101, or fixed by a network discovery protocol of type DHCP (Dynamic Host Configuration Protocol). These addresses are unique on the network 110.

With this variant of the invention, a user of the STB 101, when sitting in front of the screen 106 and using the remote control 108, launches the application 119.2 on the server 116 and views the graphic interface of said application on the screen 106. Due to the invention, the application 119.2 is capable of using the peripheral 112. In this variant, the server gateway is thus the network port used.

Figure 1B:
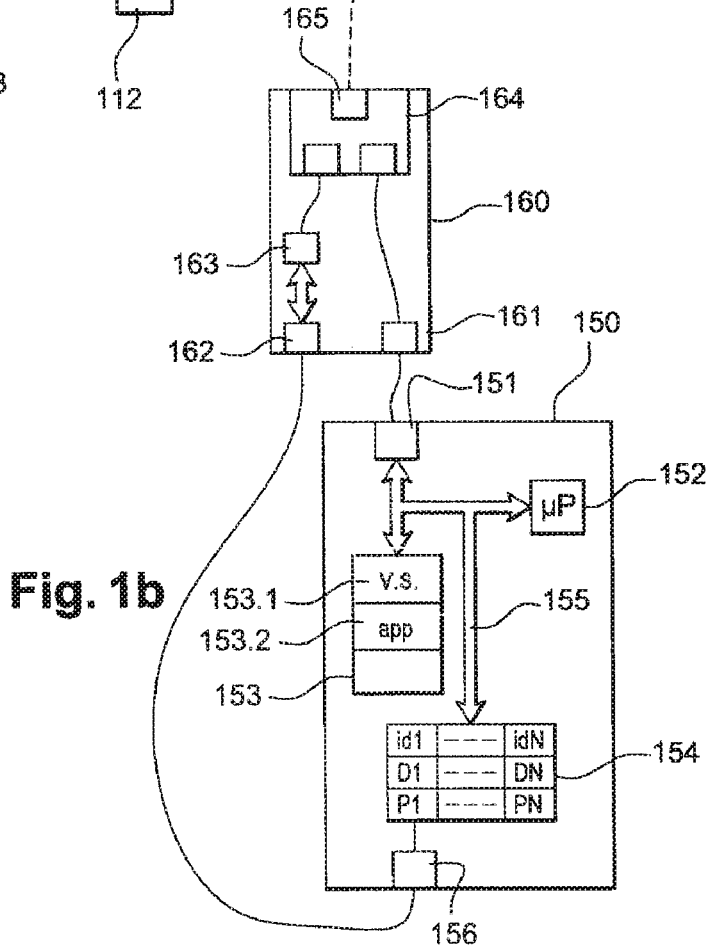
FIG. 1b: illustration of the start-up of a device of the invention in accordance with a second embodiment.

FIG. 1*b* illustrates a server 150 corresponding to the second start-up of the invention. The server 150 comprises respectively parts 151 to 155, identical to elements 117 to 121 respectively.

FIG. 1*b* also illustrates a gateway device 160. The device 160 comprises an interface 161, compatible with the interface 151. The device 160 also comprises an interface 162, compatible with an interface 156 of the server 150. In an example, the interface 156 is a USB port 156.

The device 160 also comprises the circuits 163, identical to the circuits 113.

The device 160 further comprises the circuits 164, identical to the circuits 114.

The interface 162 is connected to the circuits 163 that are connected in turn to the circuits 164. The interface 161 is connected to the circuits 164. These are connected to the network 110 via an interface 165. The interface 165 has the same network address as the server 150. The circuits 164 perform port forwarding, enabling to distribute the network traffic intended for the server 150 between the interface 151 of the server 150 and the interface 156 of the server 150. The circuits 164 allocate a port NP163 of the connection interface of the server 150 to the circuit 163. The circuits 163 ensure conversion of the signals between the interface 162 and the network 110.

In the second start-up of the invention, communications between the server 150 and the peripheral 112 are performed via the interface 156 and not via the interface 151.

In the second variant of the invention, the STB 101 and the device 160 each comprise a configuration memory for parametering the ports NP113 and NP163.

Figure 2:
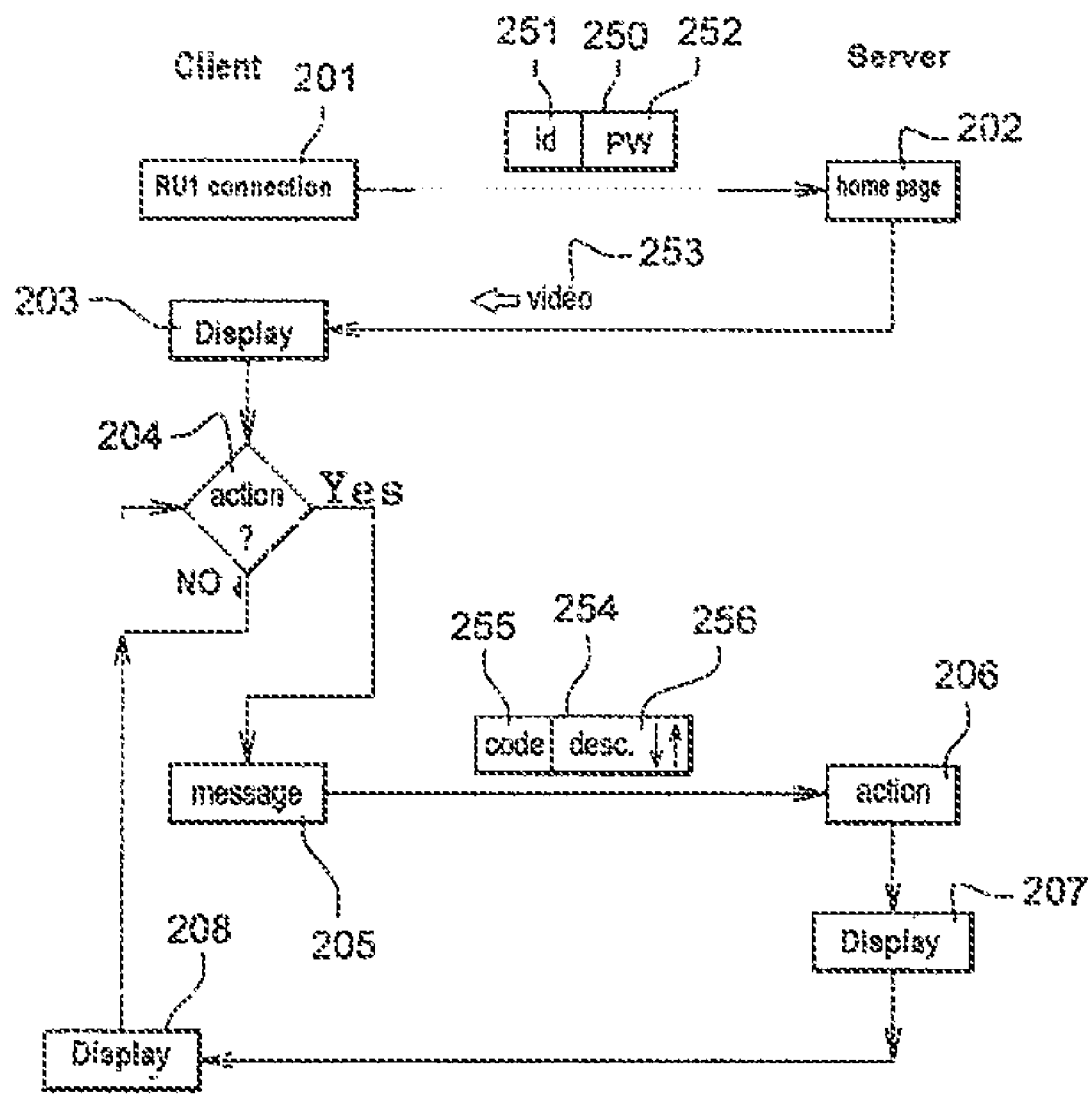
FIG. 2: illustration of the steps of the method in accordance with the invention.

FIG. 2 illustrates a connection step 201 of the thin client device 101 to the server 116. In the step 201, a user of the STB 101 uses the remote control 108 for searching through the command menus of the STB 101, the said menus being viewed on the screen 106. In these command menus, the user selects the connection option corresponding to the establishment of a connection with a remote interface server via an RUI protocol.

In practice, the remote interface server address is configured in a memory of the STB 101. It then refers to an address on the network 110, which is a local network. In a variant of the invention, selection of the connection option initiates the running of a network 110 exploration process by the STB 101 in order to detect the remote interface servers. The result of this exploration process is a list of servers in which the user selects the server of particular interest. If the result of the exploration process comprises only a single server, the STB 101 is then directly connected to this sole server without requesting intervention from the user.

The connection step 201 comprises a connection message 250 production step, comprising at least one connection identifier 251 and, in a variant, one connection password 252. This connection message is sent to the server 116, and more particularly to the application 119.1 triggered off by this server 116. The connection identifier and password are saved in a configuration memory of the STB 101. In a start-up version, the address of the STB 101 is sufficient as identifier for the server 116. This address is automatically transmitted to enable a response to the connection message.

In a step 202, the server 116, and more particularly the application 119.1, receives the message 250. The server 116 associates a profile to the identifier contained in this message. In more simple terms, this profile is a home-page image, corresponding to a so-called "virtual office". Such an image, in fact, represents a menu and is divided into zones, each zone being able to be selected, either to continue browsing through the menu or to launch a specific application, such image being sent towards the STB 101. In a variant, the profile associated with the identifier corresponds to an application, for example, the application 119.2. In such a case, the server 116 runs this application and locally, i.e. on the server 116. Such running is performed in a display window that the server refrains from displaying on its screen. Nevertheless, the contents of this display window is sent, in the form of a video sequence, towards the STB 101. A video sequence is a succession of images. Here, it is noted that a virtual office is just one application among many others.

In a step 203, subsequent to the step 202, the STB 101 receives a video sequence 253 in response to the message 250. In the step 203, the STB 101 decodes the sequence 253 and displays the resulting images on the screen 106.

The STB 101 then passes to a step 204, waiting for an action from the user. An action from the user is a request from an input peripheral of the STB 101. In our example, the input peripheral is the remote control 108. If an action is detected by the STB 101, the said STB passes to a step 205 for producing an action message 254. The message 254 comprises at least one field 255 containing an identifier of the input peripheral part having been requested. In a variant, the message 254 also comprises a field 256, describing how the part identified by the field 255 was requested. A message 254 is then for example translated, in natural wording, in the following matter:

key "1" pressed down, or
key "1" released,
verification device shifted by x+3 and y−2, etc.
This list is not restricted as such.

The action message 254 is received by the server 116 in a step 206. Insofar as the STB 101 displays the video sequence emitted by the server 116, the server 116 is capable of associating the action message with an image displayed on the screen 106. In the step 206, the server 116 thus interprets the action message according to the image displayed on the screen 106 as of when the action message was produced. This moment roughly corresponds to the time when the action message was received by the server 116. In a variant, an action message comprises a date, which enables to associate the action message with a precise image. Such a date is, for example, a temporal stamp (i.e. the number of milliseconds having passed since 1st Jan. 1970 at the time of producing the action message) or a marker within the video sequence.

This interpretation is either:
(1) the shifting of a verification device, or
(2) activation of an image zone.

In the case (1), the server 116 modifies the video sequence 253 in order to take account of the shifting of the verification device. At this point, it is to be noted that the server saves the position of the verification device. Such server is thus capable of modifying this position according to the command messages received.

In the case (2), the server undertakes the action corresponding to the zone of the activated image. Let us consider that this refers to a peripheral 112 activation command. This is perfectly possible since, for the server 116, the peripheral 112 is in fact a local peripheral. In such a case, the server 116 activates the peripheral 112 like any other peripheral connected to the server 116. For the server 116, and in relation to peripheral 112, the STB 101 is transparent.

In the step 206, the server 116 thus produces at least one command message for the peripheral 112, such command message being transported towards the peripheral 112 via the network 110, and this regardless of the RUI protocol used by the STB 101 and the server 116 for communicating. Indeed, as already stated, the peripheral 112 is a local peripheral for the server 116. Any application whatsoever run by the server 116 is thus capable of using the peripheral 112. It is here noted that the command messages and video sequences are conveyed according to the RUI protocol used for establishing an RUI connexion between the STB 101 and the server 116.

The step 206 is followed by a step 207 in which the server 116 modifies the video sequence in order to inform the user of the STB 101 that the command 254 message has been considered.

In a step 208, identical to the step 203, the STB 101 displays the modified emptied sequence. The user of the STB 101 thus observes on the screen 106 that his actions have been taken into consideration by the server 116. The user of the STB 101 also observes such consideration due to activation of the peripheral 112.

Hence, with the invention, it is possible to save data on a recording peripheral connected to the port 111. With the invention, it is also possible to connect a printer device to the port 111. Once the printer connected, it is possible to launch, via RUI, a photograph-viewing application through which it is possible to print photographs using the printer connected to the port 111. With the invention, it is also possible to connect a mass storage peripheral to the port 111. This peripheral is then considered as a local storage unit by the server 116. The server 116 is thus capable of launching applications contained on the mass storage peripheral.

With the invention, it is thus possible to transport the use of peripherals, and this regardless of the RUI protocol used. This reduces, amongst others, the power and updates required for the thin client device, namely the STB 101.

The invention claimed is:

1. A thin client device for managing, by a server over a network, a local peripheral connected to the thin client device, comprising:
   a primary interface connected to a second interface of the server over the network;
   a virtual client application connected to the server via a remote user interface (RUI) protocol;
   at least one primary local port for connecting the local peripheral; and
   a primary gateway operable to interface said at least one primary local port with the primary interface and to transform said at least one primary local port into a network port to connect the local peripheral to the network, a hub operable to split the primary interface into two network addresses, associating one network address to correspond to said at least one primary local port and associating the other network address to correspond to the thin client device itself; and
   wherein the server comprises a second gateway operable to interface the local peripheral with the second interface, thereby port forwarding said at least one primary local port into a local port of the server and enabling the server to manage and activate the local peripheral connected to said at least one primary local port of the thin client device over the network without control or supervision from the thin client device.

2. A device according to claim 1, further comprising a command peripheral for producing command messages to be received by said thin client device and transmitted to the server over the network by said thin client device.

3. A device according to claim 2, wherein each primary local port is one of the following: universal serial bus (USB), IEEE 1394, DB9, Wi-Fi or Bluetooth.

4. A device according to claim 1, wherein each primary local port is one of the following: universal serial bus (USB), IEEE 1394, DB9, Wi-Fi or Bluetooth.

5. A method for using the device of claim 1, comprising the steps of:
   connecting said virtual client application of said thin client device to a server application of the server;

receiving data comprising a man-machine interface description from the server application of the server over the network;

processing the data comprising the man-machine interface description and displaying a man-machine interface by the client application of said thin client device based on the processing result of the data;

generating a start-up command for the local peripheral connected to a primary local port in accordance with validation of an element of the man-machine interface;

detecting a command input by a user on the man-machine interface by said thin client device;

generating a command message corresponding to the command input by the user by said thin client device;

transmitting the command message to the server over the network;

processing the command message and generating a command message for the local peripheral connected to a the primary local port based on the processing result of the command message by the server.

6. A device according to claim 1, wherein the local peripheral is one of the following: a printer, a USB key, a digital camera or a DVD player/writer.

* * * * *